United States Patent [19]

Rossi

[11] Patent Number: 4,510,765

[45] Date of Patent: Apr. 16, 1985

[54] CONTROL UNIT FOR REFRIGERATORS OR FREEZERS

[75] Inventor: Guglielmo Rossi, Linkenheim, Fed. Rep. of Germany

[73] Assignee: Ranco Incorporated, Dublin, Ohio

[21] Appl. No.: 463,118

[22] Filed: Feb. 2, 1983

[30] Foreign Application Priority Data

Feb. 5, 1982 [GB] United Kingdom ............... 8203377
Apr. 26, 1982 [GB] United Kingdom ............... 8211974

[51] Int. Cl.³ ............................................. F25D 21/06
[52] U.S. Cl. ........................................ 62/154; 62/156
[58] Field of Search ............... 62/154, 156, 153, 155, 62/234, 203, 207, 208, 209

[56] References Cited

U.S. PATENT DOCUMENTS

| 2,266,799 | 12/1941 | Raney | 62/209 X |
| 2,711,079 | 6/1955 | Grimshaw | 62/154 X |
| 3,374,643 | 3/1968 | Thorner | 62/154 X |
| 4,169,358 | 10/1979 | Hansen et al. | 62/154 |

Primary Examiner—Harry B. Tanner
Attorney, Agent, or Firm—Watts, Hoffmann, Fisher & Heinke

[57] ABSTRACT

A refrigerator or freezer of the type having an electrical defrost heater associated with its evaporator has a control unit including a switch device with a first pair of contacts (16, 17) controlling the cyclic cutting-in and cutting-out of a compressor motor and a second pair of contacts (16, 18), sharing a common movable contact (16) with the first pair, controlling the periodic energization of the defrost heater. Closure of the second pair of contacts is normally obstructed by a stop member (22) which is movable by a ratchet mechanism (24, 26) or other means responsive to a predetermined number of switching cycles of the compressor motor to a defrost position in which a notch (23) in the stop member (22) permits movement of the movable contact to close the second pair of contacts (16, 18) and energize the defrost heater.

16 Claims, 6 Drawing Figures

CONTROL UNIT FOR REFRIGERATORS OR FREEZERS

This invention relates to control units for refrigerators or freezers.

It is known to provide a refrigerator or freezer with a defrost heater which is energised periodically to defrost the evaporator. Various arrangements have been proposed for effecting automatic energisation of a defrost heater at intervals. One such arrangement is described, for example, in U.K. Patent Specification No. 1,592,584. In this arrangement the periodic energisation of a defrost heater is initiated by a ratchet wheel which is indexed by one tooth pitch in response to each switching cycle of the compressor drive motor. Once in each revolution of the ratchet wheel an associated cam closes a switch which energises the defrost heater, while a further cam displaces a stop with the effect of raising the threshold temperature of the evaporator, sensed by a thermostat device at which the compressor motor is switched off, thereby initiating, automatically, an evaporator defrost cycle.

An alternative known control for the automatic defrosting of a refrigerator utilises an electrical timer which periodically cuts off the compressor motor circuit and energises an evaporator defrost heater. Such a control is commonly employed in so-called "no frost" refrigerators in which the evaporator is housed in an air circulation duct separate from a refrigerated compartment. The timer allows a fixed time interval for completion of defrosting before the normal cycling of the compressor motor is resumed under control of its thermostat. A temperature sensing device is normally provided to limit the temperature reached by the evaporator during defrosting, by switching off the defrost heater at a predetermined maximum temperature.

A timer-controlled automatic defrost system suffers from the disadvantage that there is no synchronism between the compressor motor cycling control and the defrost timer, so that a defrost cycle may be initiated when the temperature in the refrigerated compartment is such as to require the operation of the compressor. Furthermore, the length of the defrost period may be insufficient to allow complete de-icing of the evaporator. A further disadvantage is that where a motor-driven fan is provided for circulating air over the evaporator, in a separate duct, the fan is switched off during a defrost cycle; upon the resumption of normal operation following a defrost cycle the fan will be re-energised and will tend to blow moist air over the evaporator, with the risk of causing icing-up of the air circulation duct.

A device as described in the U.K. Patent Specification No. 1,592,584 suffers from the disadvantage of having a single sensing element and again no provision for avoiding the blowing of moist air when employed in a so-called "no-frost" application.

It is also known to provide an automatic defrost control in a so-called "two-door" refrigerator, that is, a refrigerator having separate compartments, accessible through respective doors, namely a refrigeration compartment for storing food above freezing temperature and a freezer compartment for storing frozen food. In this case, cooling is effected by means of two separate evaporators located in the respective compartments. A cycling thermostatic control senses the temperature of the evaporator in the refrigeration compartment and switches off the compressor motor simultaneously with the switching on of an evaporator defrost heater when the evaporator temperature reaches a predetermined limit. Such a control initiates defrosting of the evaporator once in every cycle of operation of the compressor motor. This typically results in a cycling of the evaporator temperature between temperatures of $+5°$ C. and $-20°/30°$ C. A considerable amount of energy is wasted in pulling the temperature of the evaporator down in each cycle of operation.

An object of the present invention is to provide a control unit for a freezer or refrigerator in which the normal cyclic control of a compressor, and control of periodic defrosting of an evaporator, are combined economically in a single controlled switch device.

According to the present invention there is provided a control unit for a refrigerator or freezer of the type having an evaporator, a compressor and an electrical defrost heater, associated with the evaporator, the control unit including a switch device having a first pair of contacts controlling the cyclic cutting-in and cutting-out of a drive motor of the compressor and a second pair of contacts, sharing a common movable contact with the first pair, controlling the periodic energisation of the defrost heater, the closure of the second pair of contacts being normally obstructed by a stop member which is movable by means responsive to a predetermined number of switching cycles of the compressor motor to a defrost position in which it permits movement of the movable contact to close the second pair of contacts and energise the defrost heater.

The control unit of the invention is in general applicable to any cooling or refrigeration equipment in which it is desired to effect periodic automatic defrosting of an evaporator. More particularly, the invention is applicable both to "no-frost" refrigerators of the type commonly used in North America and "two-door" refrigerators of the type commonly used in Europe.

Thus in the application of the control unit of the present invention to a "no-frost" refrigerator or freezer having an evaporator located in an air duct and a motor-driven fan for circulating air over the evaporator and into a refrigerator or freezer compartment, movement of the common movable contact to open and close the first pair of contacts, and to close the second pair of contacts, is effected by a first operating means responsive to an ambient temperature in the apparatus, and movement of said movable contact in a sense to open the pair of contacts, to terminate energisation of the defrost heater, is effected by a second operating means responsive to the evaporator temperature.

For the application of the invention to a "no-frost" refrigerator the temperature sensing to energise/de-energise the evaporator may be effected by sensing either the freezer compartment or the refrigerator compartment temperature. For an effective defrost termination it is necessary to sense the evaporator temperature by means of a sensor in close contact with it.

Preferably, therefore, the first operating means are responsive to ambient temperature in a freezer or refrigerator compartment and the second operating means are responsive to temperature in the immediate vicinity of the evaporator. The control unit according to this embodiment of the invention terminates a defrost cycle automatically when the evaporator reaches a desired defrost temperature.

A further object of the invention as applied to a "no-frost" refrigerator is to provide for a delay interval between the termination of a defrost cycle and the energisation of the fan motor, so that moist air is not blown into the refrigerated compartment. Preferably, therefore, the energisation of the fan motor is controlled by auxiliary switch contacts associated with the switch device, said auxiliary switch contacts being opened during a defrost cycle and reclosed by temperature responsive actuating means sensing the temperature of the evaporator and effective to reclose said auxiliary contacts only when the evaporator attains a specific working temperature below freezing. This arrangement ensures that the reenergisation of the fan following a defrost cycle is automatically delayed for a certain time interval after the termination of the defrost, sufficient for any moisture remaining on the evaporator to refreeze, and therefore preventing the blowing of moist air into the refrigerated compartment.

In the application of the control unit to a "two door" refrigerator having two separate compartments cooled by respective evaporators the defrost heater may be associated with one said evaporator and movement of the common movable contact is effected by operating means responsive to the temperature of one of the said evaporators. Thus in one such embodiment of the invention the operating means may comprise a bellows device acting through an operating lever on an operating element of the switch device and loaded by a first spring, the said lever or operating element being also acted upon by a further spring loaded lever, and a fixed stop being provided for preventing action of the further lever on the switch operating element when the bellows device responds to an evaporator temperature above the normal working range, during a defrost cycle. This simple arrangement ensures that, upon termination of a defrost cycle, the spring force acting on the bellows is increased by the absence of the further lever, so that operation of the switch device occurs at a higher evaporator temperature.

The invention will be further described, by way of example only, with reference to the accompanying purely diagrammatic drawings, in which.

Throughout the drawings the same reference numerals are used to designate the same or equivalent component parts of the illustrated embodiments.

Figure 1:
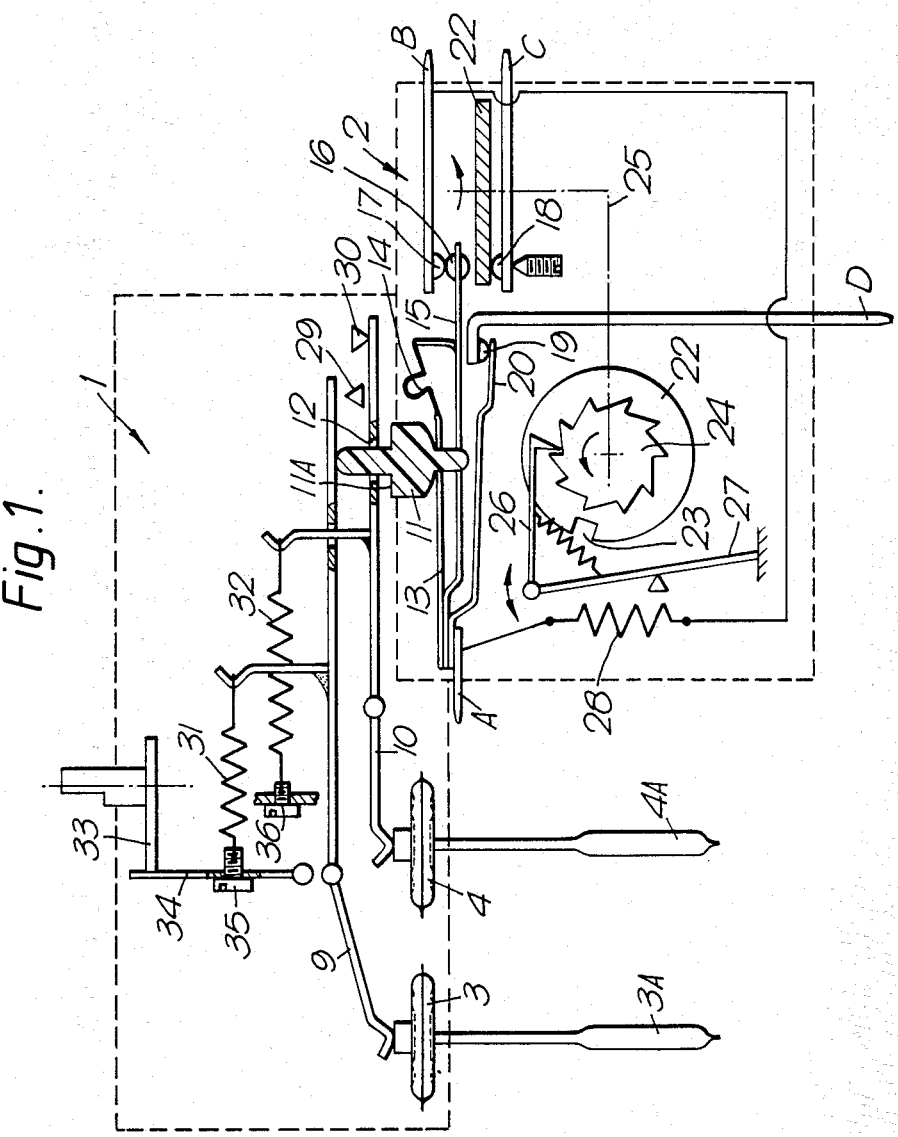
FIG. 1 is a schematic diagram of a control unit according to a first embodiment of the invention.
Figure 2:
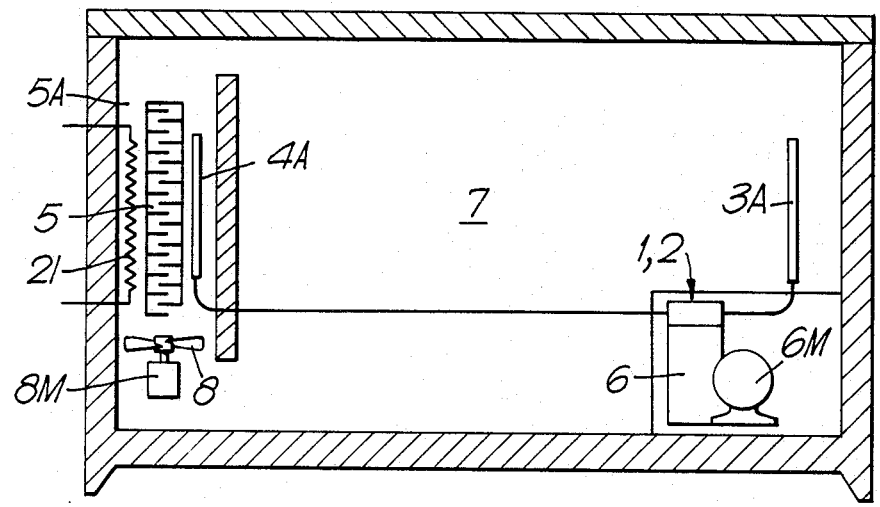
FIG. 2 illustrates diagrammatically a 'no-frost' refrigerator employing the control unit shown in FIG. 1.

Referring first to FIG. 1, a control unit is shown comprising a temperature responsive actuating mechanism 1 and a snap action switch device 2, the operation of which is controlled by two switch operating means responsive to two independent temperature sensors, in this case respective fluid-filled bellows 3, 4 connected through capillary tubes to respective fluid-filled temperature sensing bulb elements 3A, 4A as known per se. The control unit of FIG. 1 is employed in a so-called 'no-frost' refrigerator, illustrated diagrammatically in FIG. 2 in a simplified form, including an evaporator 5 and a compressor 6 forming part of a conventional refrigeration system, the compressor being driven by an electric motor 6M. The evaporator 5 is located in an air duct 5A separate from the cooled compartment 7, air being circulated over the surfaces of the evaporator 5 through the duct 5A and the compartment 7 by a fan 8 driven by an electric motor 8M. Although only one compartment 7 is illustrated, in practice the apparatus may have two compartments, for frozen food and fresh food respectively, to which chilled air is delivered from the duct 5A. In this case a movable baffle is usually provided for regulating the supply of chilled air to the fresh food compartment, either manually or by automatic regulator means responsive to temperature in said compartment. The essential characteristic of the 'no frost' refrigerator is that any moisture in the circulating air condenses on the evaporator 5, within the duct 5A, leaving the compartment or compartments 7 free of frost.

The temperature sensing element 3A is located in the ambient space of the compartment 7 while the temperature sensing element 4A is located in the duct 5A in close contact with the evaporator 5. The control unit utilises the two temperature responsive switch operating means to control the normal cyclic operation of the compressor 6, the periodic defrosting of the evaporator 5, and the operation of the fan 8, without recourse to a timer device.

The displaceable central button of each respective bellows 3, 4 bears against one end of a respective operating lever 9, 10, each lever being independently pivoted intermediate its ends in the lateral walls of the frame (not shown) of the actuating mechanism 1. At their ends remote from the bellows 3, 4 the two levers 9, 10 act upon the switch device 2 through a displaceable plunger 11 of insulating material The displaceable switch operating plunger 11 is acted upon by the first operating lever 9. The plunger 11 is formed with an annular shoulder 11A which cooperates with the second operating lever 10, which has a hole 12 through which the plunger 11 projects with clearance.

The switch device 2 is of any known snap-action type and as it is exemplified it has a cantilever operating arm 13 anchored at one end to a first terminal A and acted upon at its other end by a snap-action omega-shaped spring 14. The spring 14 interconnects the operating arm 13 and a movable contact arm 15 which is also cantilevered to the first terminal A. The contact arm 15 carries at its free end a movable contact 16 which normally engages a first fixed contact 17 carried by a second terminal B. The movable contact 16 also cooperates with, and is normally spaced from, a second fixed contact 18 carried by a third terminal C.

The switch device 2 has a fourth terminal D carrying an auxiliary fixed contact 19 cooperating with an auxiliary movable contact 20 which is also cantilevered to the first terminal A, the contacts 19, 20 being normally closed.

Figure 3:
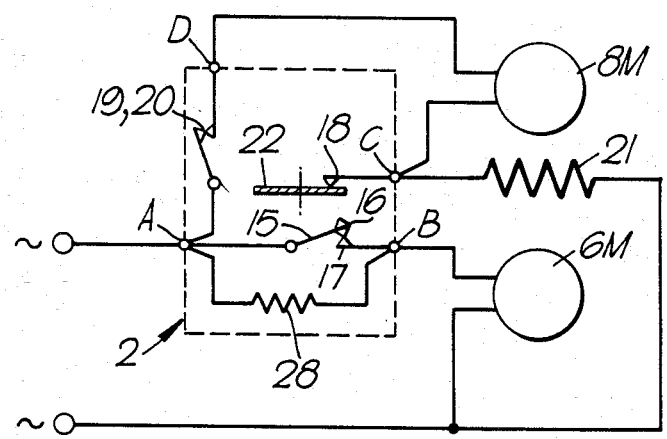
FIG. 3 is a circuit diagram of the 'no-frost' refrigerator and the control unit of FIGS. 1 and 2.

The electrical connections of the switch device 2 are shown diagrammatically in FIG. 3. The first terminal A is connected to an A.C. power supply and the second terminal B is connected to the compressor drive motor 6M. The fan drive motor 8M is connected between the third and fourth terminals C and D, and an electrical resistance defrost heater 21 is also connected to the terminal C, in series with the fan motor 8M.

The sensing element 3A of the first bellows 3, responsive to the ambient temperature in the compartment 7, controls the cyclic cutting-in and cutting-out of the compressor motor 6M through the lever 9 and the contacts 16, 17, in normal operation of the freezer. During such normal operation the fan motor 8M remains energised. When, during such normal cycling of the switch device 2, the movable contact 16 moves away from the fixed contact 17, causing compressor cut-out, the movable contact arm 15 comes into engagement with a stop 22 which blocks further movement of the contact arm 17, preventing closure of the contacts 16, 18. The stop 22 is in the form of a rotatable insulating disc having a notch or window 23 in a part of its periphery, as shown schematically in FIG. 1. When the stop disc 22 has been rotated to a position in which the notch 23 is aligned with the movable contact arm 15 the latter can pass through the notch 23, bringing the movable contact 16 into engagement with the second fixed contact 18, and thereby energising the defrost heater 21 to initiate an evaporator defrost cycle. Thus defrosting of the evaporator is initiated periodically each time the notch 23 in the stop disc 22 is aligned with the movable contact arm 15, but only during compressor cut-out. That is to say, an evaporator defrost cycle always occurs when the ambient temperature in the compartment 7 is at the lower end of its normal cycling range.

The stop disc 22 rotated intermittently by a ratchet wheel 24 which is mechanically connected to or integral with the disc 22, as illustrated diagrammatically by the chain line 25. The ratchet wheel 24 is engaged by a pawl 26 carried at the free end of a bi-metal bender element 27. A low power resistive heater 28 is associated with the bi-metal element 27, the heater 28 being connected across the switch terminals A and B so that the heater 28 is energised when the contacts 16, 17 are open, that is when the compressor motor 6M is inoperative.

The design is such that advance of the ratchet wheel by one tooth pitch occurs when the heater 28 is de-energised, that is, when the contacts 16, 17 are closed. Thus the bi-metal bender element 27, under the influence of the heater 28, bends in a clockwise direction, moving the pawl 26 to the right, as viewed in FIG. 1, to engage a tooth of the ratchet wheel 24, but the actual advance of the wheel occurs during anti-clockwise movement of the pawl 26 upon de-energisation of the heater 28, when the pawl 26 is moved to the left. With this arrangement the stepping movement of the ratchet wheel 24 does not disturb the movable contact 16.

During each cycle of opening and closing the contacts 16, 17, therefore, (that is, during each operating cycle of the compressor 6) the bi-metal bender element 27 performs a complete cycle and causes the pawl 26 to advance the ratchet wheel 24 by one pitch. In effect the ratchet mechanism acts as a counter and advances the stop disc 22 by a predetermined pitch upon each normal working cycle of the control switch 2. The defrost heater 21 will be energised once in each complete rotation of the stop disc 22, corresponding to a specific number of switching cycles of the compressor motor 6M.

In an alternative arrangement (not shown) the ratchet mechanism has a solenoid-operated pawl, the solenoid coil being connected across the contacts 16, 17 and so arranged that the pawl advances a ratchet wheel by one tooth pitch upon de-energisation of the solenoid, for example under the action of a return spring.

Energisation of the defrost heater 21, as described, will cause rapid heating of the evaporator 5. When the latter reaches a temperature just above freezing, corresponding to complete defrosting, as detected by the sensing element 4A, the bellows element 4 causes reclosure of the switch contacts 16, 17 through its associated operating lever 10 acting on the shoulder 11A of the displaceable switch operating plunger 11. Under these conditions the amount of movement necessary to reclose the contacts 16, 17 has increased with respect to the normal cycling condition of the compressor. Clockwise movement of the lever 9 is limited by the stationary stop 29, and reclosure of the contacts 16, 17 will therefore depend only on the action of the lever 10 as the predetermined defrost termination temperature is achieved. Upon reclosure of the contacts 16, 17 normal cycling of the control unit then resumes under control of the bellows 3 in response to the sensed ambient air temperature in the freezer compartment 7, as described previously.

As soon as the compressor is energised by closure of the contacts 16, 17 the bi-metal bender element 27 will cause the ratchet wheel 24 to advance one pitch, as described previously, thus removing the notch 23 from alignment with the contact arm 15 and preventing reclosure of the contacts 16, 18 upon opening of the contacts 16, 17.

Referring to the electrical circuit illustrated schematically in FIG. 3, it will be noted that the fan motor 8M is connected in series with the auxiliary contacts 19, 20 and the defrost heater 21 across the electrical power supply; similarly the bimetal heater 28 is connected in series with the compressor motor 6M. The impedance of the fan motor 8M is an order of magnitude greater than the defrost heater 21 (typically 20–30 times greater), so that when the auxiliary contacts 19, 20 are closed and the main switch contacts 16, 18 are open (FIG. 3) in normal cycling operation of the control unit, the current flow in the defrost heater 21 is negligible, about 3–5% of the current which flows when contacts 16, 18 are closed. Similarly, the impedance of the bi-metal heater 28 is high (typically 6–48 K$\Omega$) compared with the impedance of the compressor motor 6M (typically less than 500$\Omega$) so that when the switch contacts 16, 17 are open the current flowing through the compressor motor 6M is a fraction (about 7.5%) of the current which flows when the contacts 16, 17 are closed and is insufficient to drive the compressor 6.

A fixed stop 29 is located adjacent the operating lever 9 of the normal cycling bellows 3 to prevent termination of a defrost cycle in response to the resulting ambient temperature rise in the compartment 7, thereby ensuring that termination of the defrost results only from the bellows 4 responsive to the evaporator temperature. A further fixed stop 30 limits the anti-clockwise movement of the operating lever 10 in response to falling temperature of the evaporator 5 sensed by the element 4A.

The auxiliary switch contacts 19, 20 remain closed during normal cycling operation of the switch device 2, so that the fan 8 remains energised throughout such operation. When a defrost cycle is initiated by the excursion of the movable contact arm 15 through the notch 23, the closure of the contacts 16, 18, interconnecting terminals A and C (FIG. 3) short circuits the fan motor 8A, which remains de-energised during the defrost cycle. When the defrost cycle is terminated by the action of the operating lever 10 acting on the shoulder 11A of the plunger 11, in response to evaporator temperature sensed by the element 4A, the plunger 11 acts on the auxiliary contact 20, opening the contacts 19, 20 before the snap changeover of the contact 16 from the contact 18 to the contact 17. This is ensured by suitable positioning of the auxiliary contacts 19, 20, and as a result the fan motor 8M remains de-energised. Re-energisation of the fan motor 8M occurs, after a predetermined 'fan delay interval', only when the evaporator temperature, sensed by the element 4A, has fallen sufficiently to allow the operating lever 10 acting on the shoulder 11A of the plunger 11 to rotate anti-clockwise and thereby retract the plunger 11 sufficiently to permit reclosure of the auxiliary contacts 19, 20.

This fan delay interval ensures that the fan 8 does not operate until any water remaining on the evaporator surfaces after defrost has refrozen, thereby avoiding the blowing of moist air through the evaporator duct, which would lead to icing of the duct surfaces, and mist formation.

As shown in FIG. 1, the two levers 9, 10 are acted upon by respective tension springs 31, 32 which exert moments on the two levers in opposition to the respective bellows 3, 4 so that the levers 9, 10 are urged by the springs 31, 32 towards contact with the movable buttons of the respective bellows 3, 4. The tension in the spring 31 predetermines the ambient temperature in the compartment 7 at which the bellows 3 effects cut-out of the compressor motor 6M, while the tension in the spring 32 predetermines the evaporator temperature at which the bellows 4 terminates a defrost cycle. The tension in the spring 31 is adjustable manually by means of a setting cam 33 cooperating with a cam follower 34 which carries an anchorage 35 for the spring 31. The tension in the spring 32 is adjustable by a screw anchorage 36 in the frame of the actuating mechanism 1. The operation of the control unit of FIGS. 1 to 3 as applied to a 'no frost' refrigerator may be summarised as follows:

(i) normal cycling operation

The compressor motor 6M is cut-in and cut-out cyclically in response to ambient temperature sensed by the element 3A. The fan motor 8M is energised continuously through the closed auxiliary contacts 19, 20, and the bimetal heater 28 is energised cyclically, that is, each time the contacts 16, 17 are opened, and the resulting cyclic flexing of the bimetal bender element 27 advances the ratchet wheel 24, and the stop disc 22, progressively. During this cyclic operation the lever 10 abuts the stop 30, so that the evaporator 5 runs very cold.

(ii) Defrost initiation

After a certain number of compressor switching cycles the ratchet wheel 24 will have advanced the notch 23 into register with the movable contact arm 15. This movement occurs when the bimetal heater 28 is de-energised, causing flexing of the bimetal element 27 to the left as viewed in FIG. 1, and therefore when the contacts 16, 17 are closed, so that the contact arm 15 does not interfere with the movement of the stop disc 22. The next opening of the switch contacts 16, 17 is then accompanied by an excursion of the contact arm 15 through the notch 23, closing the contacts 16, 18. This causes de-energisation of the fan motor 8M, which is short-circuited by closure of the contacts 16, 18, and energisation of the defrost heater 21, while the compressor motor 6M remains de-energised.

(iii) Defrost termination

The stop 29 prevents the lever 9 from acting on the switch operating button 11 as the ambient temperature sensed by the element 3A rises, since the lever 9 acted upon by the associated bellows 3 is arrested by the stop 29. The defrost continues until the evaporator temperature sensed by the element 4A rises sufficiently (to a temperature above freezing) for the plunger 11 to be moved by the lever 10 acting on the shoulder 11A, the plunger 11 displacing the operating arm 13 to cause snap re-closure of the contacts 16, 17. When this occurs the compressor motor 6M is re-energised and the defrost heater 21 is de-energised. The fan motor 8M remains de-energised, however, by virtue of the opening of the auxiliary contacts 19, 20 by the plunger 11, this having occurred before the re-closure of the contacts 16, 17. The fan 8 remains de-energised until the evaporator temperature has fallen sufficiently below freezing to allow reclosure of the auxiliary contacts 19, 20 by the anti-clockwise movement of the lever 10 towards engagement with the stop 30. The fan motor 8M is then re-energised and the unit reverts to the operative state illustrated in FIG. 1 until the next defrost cycle is initiated. The evaporator temperature at which the defrost cycle is terminated is predetermined by the preset tension of the spring 32.

Figure 4:
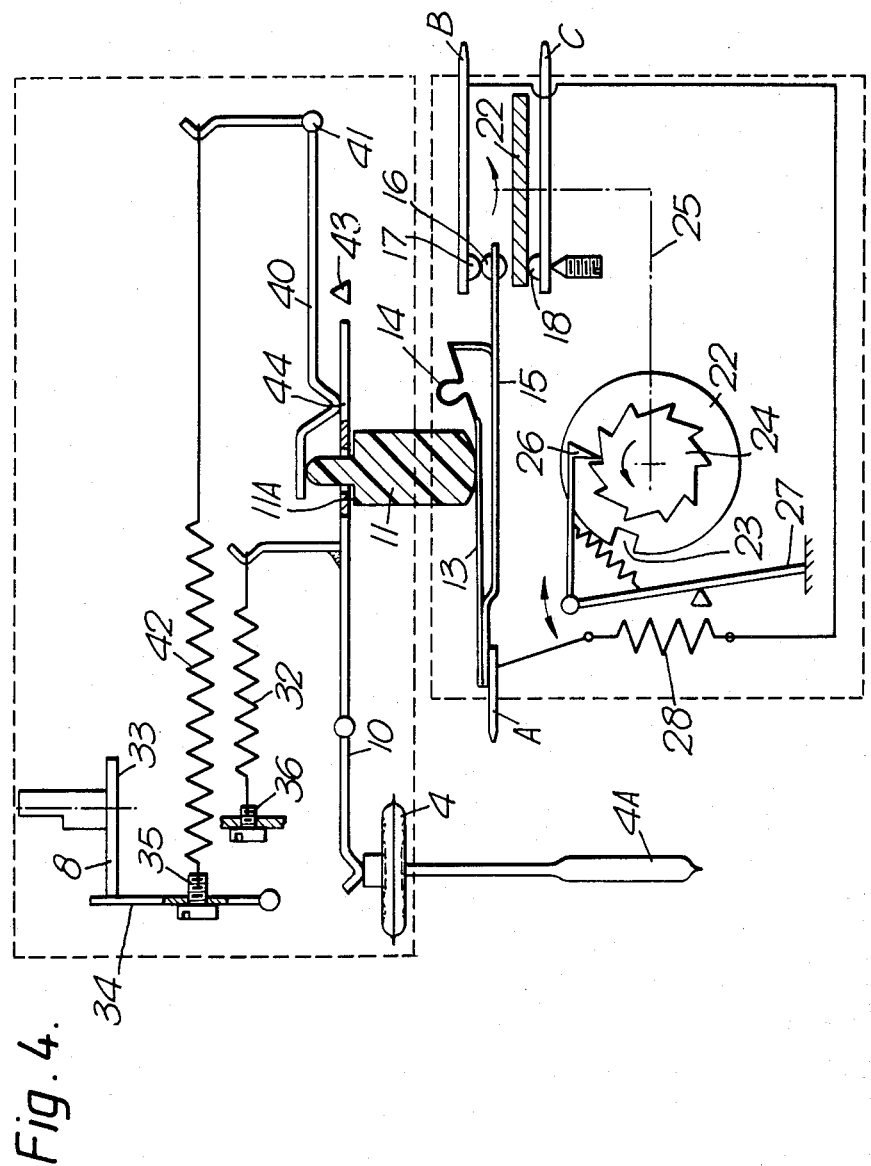
FIG. 4 is a schematic diagram, corresponding to FIG. 1, of a control unit according to a second embodiment of the invention.
Figure 5:
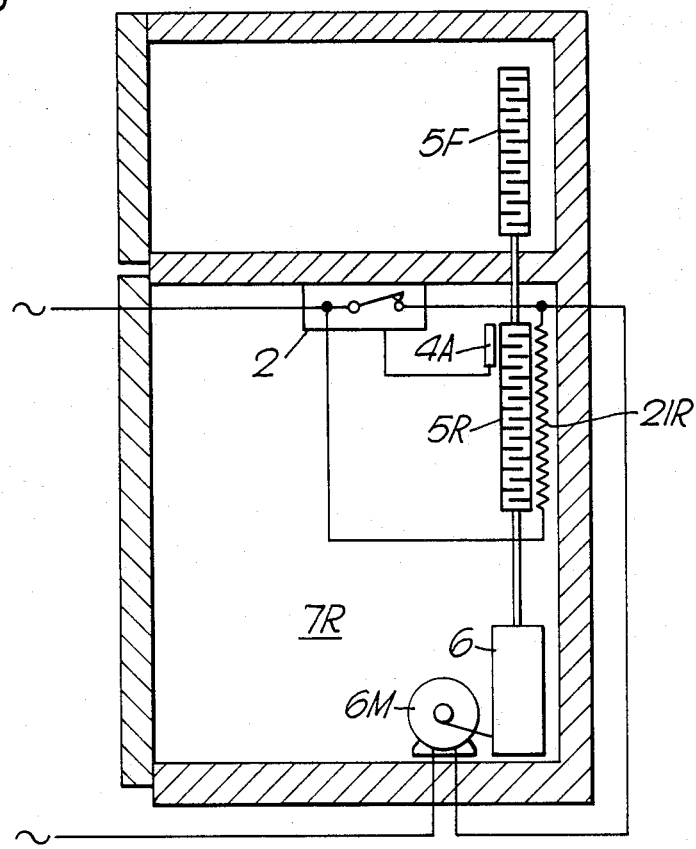
FIG. 5 illustrates diagrammatically a 'two door' refrigerator employing the control unit of FIG. 4.

FIG. 4 illustrates a control unit according to a second embodiment of the invention, applicable to a so-called 'two door' refrigerator, of the type depicted diagrammatically in FIG. 5. The refrigerator has two separate compartments, namely a freezer compartment 7F and a refrigerated compartment 7R which are accessible through separate doors (not shown) and which are cooled by separate evaporators 5F and 5R located in the compartments 7F and 7R respectively. The evaporators 5F and 5R are connected in a conventional refrigeration circuit with a common compressor 6 driven by a motor 6M.

The control unit, like that of FIG. 1, has an actuating mechanism 1 and a switch device 2 incorporating a ratchet mechanism 22–26 for controlling periodic defrost cycles, in which a defrost heater, 21R in the vicinity of the evaporator 5R is energised. The ratchet mechanism is essentially the same as that already described with reference to FIG. 1, and will not therefore be described in detail. The switch operating means in this embodiment differs, however, in that only one temperature sensing element, 4A, and associated bellows 4, is provided. The temperature sensing element 4A is located in close proximity to the evaporator 5R in the refrigerated compartment 7R. The associated bellows 4 acts through an operating lever 10 on an annular shoulder 11A of a switch operating plunger 11. The lever 10 is loaded in opposition to the bellows 4 by a tension spring 32 having an adjustable screw anchorage 36 in the frame of the actuating mechanism 1.

A bellcrank lever 40, pivoted in the frame of the mechanism about a pivot 41, acts on the plunger 11 and is loaded against the latter by a tension spring 42 which is anchored at 35 to a cam follower 34 cooperating with a manually adjustable setting cam 33. A stop 43 limits movement of the bellcrank lever 40 in an anti-clockwise (FIG. 4) sense. The bellcrank lever 40 is formed with a nose 44 which is engageable with the free end of the lever 10.

Figure 6:
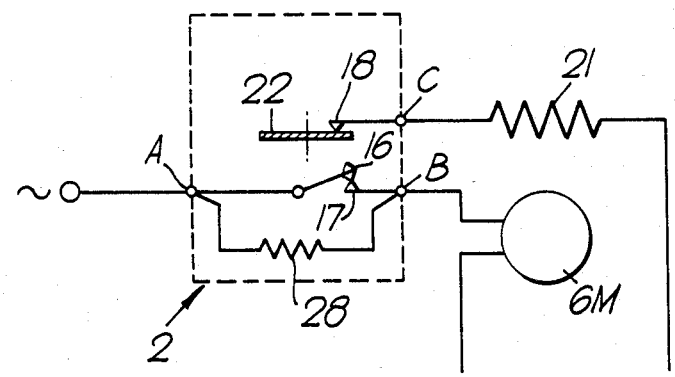
FIG. 6 is a circuit diagram of the 'two door' refrigerator and the control unit of FIGS. 4 and 5.

Since there is no fan in the two door refrigerator the electrical circuit of the refrigerator and the control unit, shown schematically in FIG. 6, is simplified.

The mode of operation of the control unit of FIGS. 4 to 6 may be summarised as follows:

(i) Normal cycling operation

The two levers 10 and 40 both act on the switch operating plunger 11, opening and closing of the contacts 16, 17 being controlled by the bellows 4 to cut-out and cut-in the compressor motor 6M cyclically. The cut-in and/or cut-out temperatures of the evaporator 5, both below zero, are predetermined by the combined effect of the two springs 32 and 42. The stop disc 22 is interposed between the contacts 16 and 18, and the disc 22 and is rotated progressively by the ratchet wheel 24 which is advanced by one tooth pitch each time the pawl-driving bimetal 27 makes a complete flexing cycle. The bimetal heater 28 is energised each time the contacts 16, 17 are opened.

(ii) Defrost cycle

When the notch 23 in the stop disc 22 has been brought into register with the movable contact arm 15 the latter can make an extended stroke, closing the contacts 16, 18, to energise the defrost heater 21 in response to an anti-clockwise movement of the lever 10 resulting from contraction of the bellows 4 as the evaporator 5R reaches the lower limit of its operating range of temperatures.

The defrost cycle is terminated by the bellows 4 acting through the lever 10 on the shoulder 11A of the switch operating plunger 11, causing reclosure of the contacts 16, 17 at an evaporator temperature which is predetermined by the tension of the spring 32 acting alone, the other lever 40 being prevented from acting on the plunger 11 or the lever 10 in this defrost position of the arm 15 by engagement of the lever 40 with the stop 43. The preset tension in the spring 32 determines an evaporator temperature which is above freezing for the termination of the defrost cycle. Upon resetting of the contact arm 15 the unit reverts to its normal cycling operation with the evaporator temperature cycling through its normal, sub-zero, range.

What is claimed is:

1. A control unit for a refrigerator or freezer of the type including an evaporator, a compressor having a drive motor, and an electrical defrost heater associated with the evaporator, the said control unit including a switch device having a first pair of contacts controlling the cyclic cutting-in and cutting-out of the compressor drive motor, wherein the switch device has a second pair of contacts and a movable contact common to the first and second pair of contacts, the second pair of contacts controlling the periodic energisation of the defrost heater, a stop member associated with the second pair of contacts and normally obstructing closure thereof, actuator means acting on the stop member, said actuator means being responsive to a predetermined number of switching cycles of the compressor motor to move the stop member to a defrost position in which it permits movement of said movable contact to close the second pair of contacts and thereby energise the defrost heater, first operating means acting upon the common movable contact to open and close the first pair of contacts and to close the second pair of contacts, said first operating means being responsive to an ambient temperature in the apparatus, and second operating means for effecting movement of said movable contact in a sense to open the second pair of contacts to terminate energisation of the defrost heater, said second operating means being responsive to the evaporator temperature.

2. The control unit defined in claim 1 for a 'no-frost' refrigerator or freezer having a fan for blowing air over the evaporator in normal operation of the apparatus, wherein the fan is driven by an electric fan drive motor and the switch device has auxiliary switch contacts which control energisation of the fan drive motor, said auxiliary switch contacts being opened during a defrost cycle, and including temperature responsive actuating means sensing the temperature of the evaporator and acting upon said auxiliary contacts to reclose the latter only when the evaporator attains a specific working temperature below freezing.

3. The control unit defined in claim 2 wherein the fan drive motor is connected across the second pair of contacts so as to be short-circuited when said second pair of contacts are closed, during a defrost cycle, and wherein the impedance of the fan drive motor is substantially greater than that of the defrost heater, whereby the latter passes only a small fraction of its normal operating current through the fan drive motor when the second pair of contacts are open.

4. The control unit defined in claim 3, wherein the auxiliary contacts are connected in series with the fan drive motor, the auxiliary contacts being normally closed and being arranged to be opened under the action of the common movable contact when the latter moves into its defrost position.

5. A control unit for a refrigerator or freezer of the type including an evaporator, a compressor having a drive motor, and an electrical defrost heater associated with the evaporator, the said control unit including a switch device having a first pair of contacts controlling the cyclic cutting-in and cutting-out of the compressor drive motor, a second pair of contacts controlling the energisation of the defrost heater, a movable contact common to the first and second pair of contacts, and temperature responsive means acting upon the movable contact, a rotatable stop member associated with the movable contact and normally obstructing closure of the second pair of contacts, the stop member having a defrost angular position in which it permits closure of said second pair of contacts, a ratchet mechanism for effecting angular movement of the stop member and actuator means acting upon the ratchet mechanism to advance the stop member by a predetermined pitch upon each operation of the actuator means, wherein the improvements consist in that the actuator means of the ratchet mechanism are mechanically independent of the movable contact and are energised under control of the first pair of contacts to advance the stop member by one pitch, and the stop member is normally interposed between the second pair of contacts and has a notch through which the movable contact passes to close the second pair of contacts when the stop member is in its defrost angular position.

6. The control unit defined in claim 5, wherein the temperature responsive means comprises first operating means acting upon the common movable contact to open and close the first pair of contacts and to close the second pair of contacts, said first operating means being responsive to an ambient temperature in the apparatus, and second operating means for effecting movement of said movable contact in a sense to open the second pair of contacts to terminate energisation of the defrost heater, said second operating means being responsive to the evaporator temperature.

7. The control unit defined in claim 6, wherein the first and second temperature responsive operating means include respective bellows devices and respective operating levers through which said bellows devices act on the switch device.

8. The control unit defined in claim 7, including a displaceable plunger through which the operating lever of the first temperature responsive operating means acts on the movable contact of the switch device, said displaceable plunger having a shoulder against which the operating lever of the second operating means acts.

9. The control unit defined in claim 7 or claim 8, including respective biassing springs acting upon the respective operating levers in opposition to the respective bellows devices and means for adjusting independently of each other the forces exerted by the two springs.

10. The control unit defined in claim 7 or claim 4, for controlling the operation of a 'no-frost' refrigerator or freezer having an evaporator located in an air duct and a motor-driven fan for circulating air over the evaporator and into a compartment, wherein the first operating means are responsive to ambient temperature in the said compartment and the second operating means are responsive to temperature in the immediate vicinity of the evaporator.

11. The control unit defined in claim 5, wherein said control unit is applied to a 'two door' refrigerator having two separate compartments, one compartment cooled by said evaporator and the second compartment cooled by a second evaporator, said defrost heater associated with one of said evaporators, and said temperature responsive means responsive to the temperature of said one evaporator for effecting movement of the common movable contact.

12. The control unit defined in claim 11, wherein said temperature responsive means comprise a bellows device acting through a first operating lever on an operating element of the switch device a first spring loading said first operating lever, a second lever acting upon said first lever and a second spring acting upon the second lever, and wherein a fixed stop is provided for preventing action of the second lever on the switch operating element when the bellows device responds to an evaporator temperature above the normal working range, during a defrost cycle.

13. The control unit defined in claim 5, wherein the ratchet mechanism comprises a ratchet wheel, a pawl driving said ratchet wheel, a bimetal bender element for moving the pawl to advance the ratchet wheel, and a heater associated with the bimetal and controlled by the first pair of contacts of the switch device to effect periodic operation of the pawl.

14. The control unit defined in claim 13, wherein the bimetal is connected to the pawl so as to cause advance of the ratchet wheel during the running of the compressor.

15. The control unit defined in claim 13, wherein the heater is a resistive heating element connected across the first pair of contacts so as to be energised when said first pair of contacts are open, the impedance of said heating element being substantially greater than that of the compressor drive motor so that the compressor is de-energised when the first pair of contacts are open.

16. A control unit for a refrigerator or freezer of the type including an evaporator, a compressor having a drive motor, and an electrically controlled defrosting means for effecting heating of the evaporator, the said control unit including a switch device having a first pair of contacts controlling the cyclic cutting-in and cutting-out of the compressor drive motor, a second pair of contacts controlling the periodic operation of said defrosting means, a movable contact common to the first and second pair of contacts, a stop member associated with said second pair of contacts and normally obstructing closure thereof, actuator means acting on the stop member to move the stop member to a defrost Position in which the stop member enables movement of said movable contact to close the second pair of contacts and thereby initiate operation of the defrosting means, first operating means acting on the common movable contact to open and close the first pair of contacts and to close the second pair of contacts, said first operating means being responsive to an ambient temperature in the apparatus, and second operating means for effecting movement of said movable contact in a sense to open the second pair of contacts to terminate operation of the defrosting means, said second operating means being responsive to the evaporator temperature.

* * * * *